United States Patent [19]

Brady, III

[11] 4,166,999

[45] Sep. 4, 1979

[54] HIGH RESOLUTION PHASE SHIFTER BEAMFORMER FOR A CYLINDRICAL ARRAY

[75] Inventor: Jesse J. Brady, III, Austin, Tex.

[73] Assignee: The United States of America as represented by the Secretary of the Navy, Washington, D.C.

[21] Appl. No.: 894,874

[22] Filed: Apr. 10, 1978

[51] Int. Cl.$^2$ .............................................. G01S 3/80
[52] U.S. Cl. ................................... 367/105; 367/122
[58] Field of Search ..................... 340/6 R, 6 S, 16 R

[56] References Cited

U.S. PATENT DOCUMENTS

| | | | |
|---|---|---|---|
| 3,370,267 | 2/1968 | Barry | 340/6 R |
| 3,810,082 | 5/1974 | Arens | 340/6 R |
| 3,835,448 | 9/1974 | Bertheas | 340/6 R |

*Primary Examiner*—T. H. Tubbesing
*Attorney, Agent, or Firm*—Richard S. Sciascia; Harvey A. David

[57] ABSTRACT

A digital beamformer for use with a cylindrical sonar array effects sequential quadrature pair sampling of the outputs of M array elements used to form each beam, the resulting X and Y samples being digitized and fed alternatively to two serial-in, parallel out shift registers having M stages. M shading modules are responsive to the digitized element output samples in the corresponding stages of the two shift registers to alternately provide M shaded X and Y outputs. A multiple layer digital adder tree sums pairs of adjacent shaded X outputs and adjacent shaded Y outputs to provide the final beamformer output.

9 Claims, 2 Drawing Figures

HIGH RESOLUTION PHASE SHIFTER BEAMFORMER FOR A CYLINDRICAL ARRAY

BACKGROUND OF THE INVENTION

This invention relates generally to sonar systems, and more particularly to signal processing within high resolution systems so as to form directional beams.

Prior beamforming techniques have employed phase shifting and amplitude shading of signals from a plurality of array sensors, followed by summing of the phase shifted and shaded signals to produce a directional response pattern, or beam. These techniques have employed both analog and digital implementations. However, the requirement to perform numerous multiplications on sampled data during short pulse lengths has restricted the high resolution beamforming process to parallel analog techniques having other disadvantages. For example, analog beamformers, such as that disclosed in U.S. Pat. No. 3,274,536 of F. R. Abbott, et al, have been devised wherein signals from hydrophone elements are divided into sine and cosine quadrature components. These are amplitude shaded in accordance with hydrophone positions, and then summed to provide the desired beamwidth and sidehole suppression. Implementation has been by means of transformer windings wherein shading coefficients are determined by number and direction of winding turns. In sonar applications wherein 360°, narrow beam coverage is desired, with the formation of multiple beams during a given pulse length so that the sonar can "look" in more than one angular direction at a given range increment, the number of transformer winding leads and connections becomes very large. Such systems are bulky, expensive, and subject to reliability and maintenance problems.

A digital beamformer has been proposed heretofore which uses quadrature sampled data that is quantized in nonlinear steps. By using geometric encoding of data, multiplication operations become additions of geometric data, with both phase shifting and amplitude weighting being accomplished before the geometrically encoded data is converted to its linear representation for summation in a linear accumulator. In that system, multiple beams are formed serially in one beamformer, with hydrophone element samples serially shifted past one phase shifting and amplitude shading operator. Disadvantages of that system included the added error introduced by geometric quantization and the relative slowness of the beam formation because of the serial element shading technique of the processor.

SUMMARY OF THE INVENTION

With the foregoing in mind it is a principal object of this invention to provide an improved, high resolution beamformer suitable for use in a sonar system having a cylindrical array of transducer elements.

Another object of the invention is the provision of a digital beamformer that eliminates the previous disadvantages of using a separate beamformer for each beam direction by sampling successive elements in the array and serially forming successive beams in one beamformer.

Still another object of the invention is to provide an improved digital beamformer that provides for a combination of both phase shifting and amplitude shading in forming a beam.

Yet another object is to provide a sonar beamformer having greater available dynamic range than has been practical heretofore.

A further object is to provide a digital beamformer that enjoys a speed advantage of M over certain known digital beamformers, when M is the number of elements used to form a beam.

As another object the invention aims to provide a system wherein all operations are linear and that requires no reconversion from geometric to linear quantizing before summing shaded elements.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
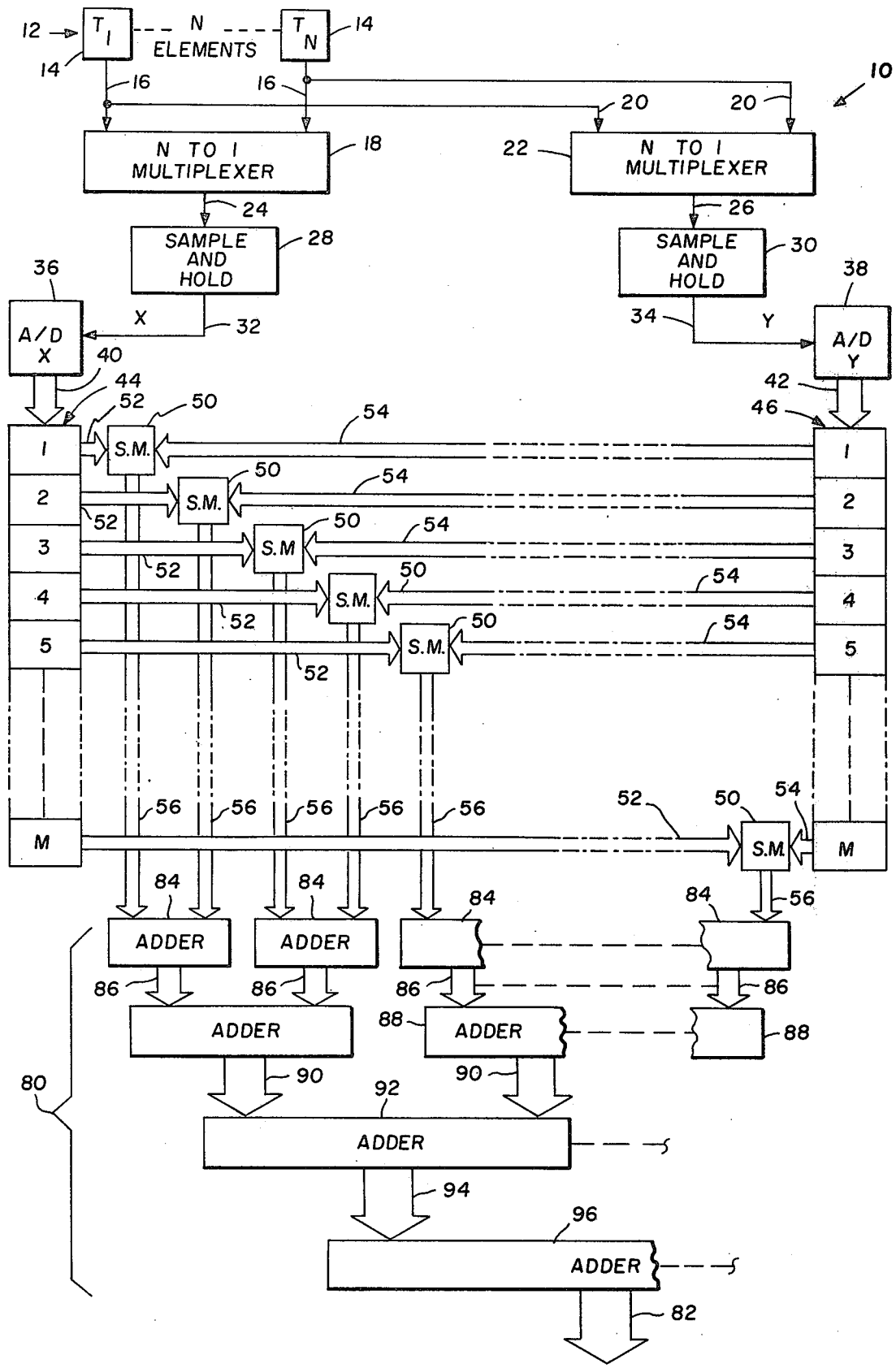
FIG. 1 is a diagrammatic illustration, in block form, of a digital beamformer system embodying the invention.

In the form of the invention illustrated in FIG. 1 and described hereinafter, a digital beamformer for a sonar system is generally indicated at 10 and is associated with a sonar tranducer array 12 comprising a plurality of N acoustic sensor elements 14. The array 12 may be cylindrical with the N elements 14 spaced equally thereabout so as to cover a portion or all 360° of azimuth. The electrical analog output signals of the elements 14, corresponding to the arrival of an acoustic energy wavefront at the respective array elements, are fed in parallel, as shown by flow lines 16, to a first N to 1 multiplexer 18. The outputs of the array elements 14 are also fed in parallel via N lines 20 to a second N to 1 to multiplexer 22.

The outputs of multiplexers 18 and 22 are applied, as shown by lines 24 and 26 to sample and hold circuits 28 and 30, respectively. Quadrature (X and Y) samples of the array element analog output signals are taken by the sample and hold circuits and fed via lines 32 and 34 to two parallel operating analog to digital converters 36 and 38, respectively.

The digitized X and Y sample outputs of converters 36 and 38 are fed, as shown by broad flow lines 40, 42, to the first or input stages of a pair of serial-in-parallel-out shift registers 44 and 46, respectively.

The shift registers 44, 46 each comprise M stages, where M is the number of array elements 14 that are used to form each beam. Connected between the shift registers 44 and 46 are M shading modules 50. The M shading modules 50 are each responsive to the X and Y digital samples, represented by broad flow lines 52, 54, in corresponding ones of the M stages of the shift registers. The construction of the M shading modules 50 will later be described in more detail with reference to FIG. 2. Suffice it to say at the moment that the shading modules provide digital outputs 56 that are the result of three simultaneously performed arithmetic operations on the corresponding X and Y digital samples appearing at the X and Y shift register outputs.

Figure 2:
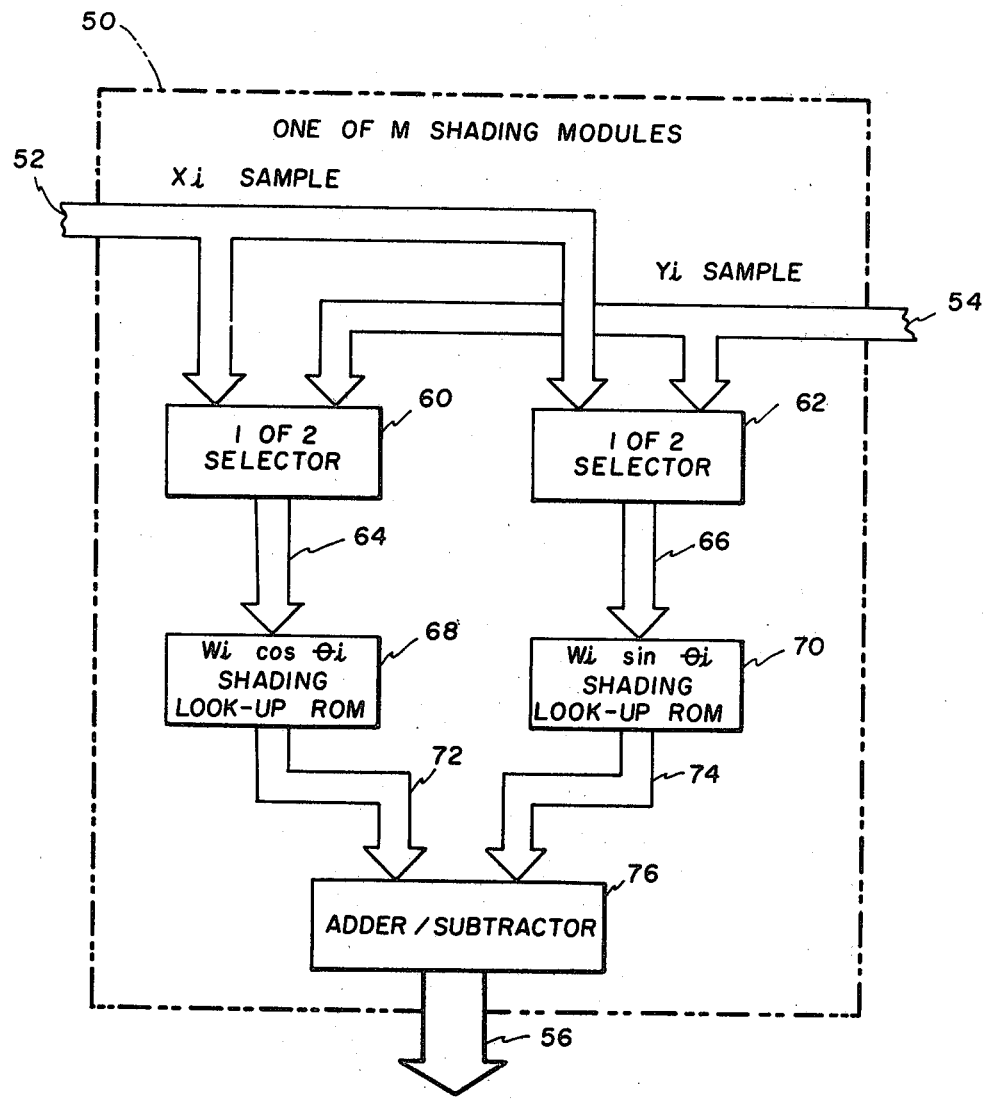
FIG. 2 is a diagrammatic illustration of a shading module portion of the system of FIG. 2.

Referring now to FIG. 2, each shading module 50 comprises first and second one-of-two selectors or gates 60, 62. These gates are connected to receive the $X_i$ and $Y_i$ digital inputs 52, 54 from the corresponding i th stages of shift registers 44, 46.

The outputs of gates 60, 62 are applied, via flow lines 64, 66 as the address commands to ROMs (read only memories) 68 and 70, respectively. As will be described more fully hereinafter, the ROM 68 serves the purpose of a look-up table to provide $W_i \cos \theta_i$ shading of the samples, while the ROM 70 serves as a look-up table to provide $W_i \sin \theta_i$ shading of the samples. The digital outputs 72, 74 of the ROMs 69, 70, respectively, are fed to a digital adder/subtractor 76 to complete the shading module 50.

Reverting now to FIG. 1, the outputs 56 of successive pairs of adjacent shading modules 50 are applied to an adder tree 80 for layered summation into a final digital beamformer output 82. The adder tree 80 comprises a first layer of digital full adders 84 which sum the shaded samples 56 from adjacent modules 50. Thus, the outputs 56 of the shading modules 50 serving the first pair of shift register stages, that is stages 1 and 2 of shift registers 44 and 46, are added in a first of the first layer adders 84. The outputs of the shading modules 50 serving the next pair of stages, that is stages 3 and 4 of the shift registers, are added in an adjacent first layer adder 84, and so on for the remaining pairs of shading modules.

The outputs 86 of pairs of adjacent first layer adders 84 are applied as paired inputs to adders 88 of a second layer of the tree 80. Similarly, the outputs 90 of pairs of adjacent second layer adders 88 are applied as paired inputs to third layer adders 92, and the outputs 94 of pairs of adjacent third layer adders are applied as paired inputs to a following layer adder 96. In the illustrated example, adder 96 is representative of the final layer adder with the output thereof being the final digital beamformer output 82.

In each layer of adders, because adjacent inputs are added, the number of partial sums will be reduced by at least one-half at each layer. The reduction continues until the total summation is accomplished in the final layer. With each additional layer, the length of the partial sums increases by 1 bit. When the needed dynamic range has been reached in the summation, less significant bits in the partial sums may be dropped in succeeding additions.

It will be understood that the actual number of layers in the adder tree 80 will depend upon the number M of array elements 14 that are to be used to form each beam.

MODE OF OPERATION

In accordance with this invention, digital phase shift beamforming comprises quadrature sampling of the output of each of the M elements 14, used to form a beam, every $P_L$ seconds, where $P_L$ is the pulse length of the sonar transmission. The samples are digitally phase shifted to form a virtual line array and amplitude shaded to form the directional beam. The sum of the phase shifted, amplitude shaded samples is the quadrature magnitude of the beam. The equation for the formed beam can be broken into its quadrature components so that $$X = \sum_{i=1}^{M} [w_i \cos \theta_i] x_i + [w_i \sin \theta_i] y_i \text{ and}$$

$$Y = \sum_{i=1}^{M} [w_i \sin \theta_i] x_i - [w_i \cos \theta_i] y_i,$$

where M is the number of elements used to form the beam, w is the amplitude shading for the i th element, $\theta_1$ is the phase shifting correction angle of the i th element, $x_i$ is the first sample of the quadrature, and $y_i$ is the second sample of the quadrature pair, taken ¼ period of the transmitted frequency later than $x_i$.

In order to sample the outputs of the elements used, the array 12 is scanned by switching means (not shown) in a conventional manner, and the outputs fed via the multiplexers 18 and 22 to the sample and hold circuits 28 and 30 serving the analog to digital converters 36 and 38, respectively. The sample and hold circuit 28 takes M sequential samples x of the X quadrature components of the outputs of the M elements 14 used in forming one beam. The sample and hold circuit 30 is operated ¼ period of the sonar transmission frequency behind the operation of circuit 28 so as to take M sequential samples y of the Y quadrature components of the M elements 14. These x and y quadrature pair samples are digitized by converters 36 and 38 respectively and serially introduced into the X and Y shift registers 44 and 46.

For a given shift register stage, i, corresponding to the i th element used to form the beam, the corresponding shading module 50 first performs the phase shifting and amplitude shading on the $x_i$ and $y_i$ samples to generate the $X_i$ components of the resultant:

$$X_i = [w_i \cos \theta_i] x_i + [w_i \sin \theta_i] y_i.$$

Next, the module performs the shading on the same sampled data to give the $Y_i$ component of the resultant:

$$Y_i = [w_i \sin \theta_i] x_i - [w_i \cos \theta_i] y_i.$$

Inspection of the equations show that for a given stage in one of the shift register 44 or 46, the shading coefficients and the phase shift components can be lumped together as a single constant multiplied by the sampled data. Given that the sampled data has been quantized in the corresponding A/D converter 36 or 38 to $2^n$ levels, the result of each multiplication in the equations can be stored in a corresponding ROM 68 or 70 with $2^n$ locations. This is equivalent to a look-up table in which the sampled data serve as the address to the ROM, the contents of which address is the pre-calculated result of multiplying the address by the constant. By scaling the constants to have values from zero to one, the result of the implied multiplication will have the same maximum dynamic range as the input address. Thus, an N bit binary sample on the ROM address lines can produce up to an N bit result on the output lines.

Control logic, comprising the gates 60, 62, first selects the $x_i$ sample as the address to the ($w_i \cos \theta_i$) ROM 68 and the $y_i$ sample as the address to the ($w_i \sin \theta_i$) ROM 70. Concurrently, the outputs of the ROMs are added in the adder/substractor 76 to give the result $$X_i = [w_i \cos \theta_i] x_i + [w_i \sin \theta_i] y_i.$$

Next, the control logic selects the $y_i$ sample as the address to the $w_i \cos \theta_i$ ROM and the $x_i$ as the address to the $w_i \sin \theta_i$ ROM. The outputs of the ROMs are substracted in the adder/substractor 76 to give $$Y_i = [w_i \sin \theta_i] x_i - [w_i \cos \theta_i] y_i.$$

With M stages in each register and M outputs of the shading modules, the summing of the resulting M phase shifted, amplitude shaded samples is done in the adder tree 80, in the manner previously described.

When the $x_i$ components are on the outputs 56 of the M shading modules 50, the resultant x components of the beam magnitude for those samples appear on the adder tree output 82. Likewise, when the $y_i$ components appear on the shading module outputs, the Y component of the beam is on the adder tree output 82. The beamforming is complete as the equations, $$X_j = \sum_{i=1}^{M} [w_i \cos \theta_i] x_i + [w_i \sin \theta_i] y_i, \text{ and}$$

$$Y_j = \sum_{i=1}^{M} [w_i \sin \theta_i] x_i - [w_i \cos \theta_i] y_i$$

have been completed for the j th beam direction. As each element's sampled pair is serially entered in the shift registers, the preceding samples are shifted to the next shading module position. Thus, after the initial delay of filling the M stages of the shift registers, a new beam is formed each time a new sample pair is shifted into the register.

The use of ROMs as the look-up tables for shading samples may be replaced in some cases by a hard-wired scaling operation. Just as the values of the delay used in the phase shift beamformer have been reduced to a small number of values, so too, the values for digitally scaling the quadrature samples can be limited to binary powers. For example, the scaling of inputs by powers of two would be equivalent to shifting the samples n places to the right, where n varies from 0 to N. The corresponding scale factors would be $\frac{1}{2}$ to $\frac{1}{2}^N$. While this simplification eliminates the need for the ROMs, it degrades the beam formed so that more elements are needed to obtain the required beam characteristics. The tradeoffs in choosing scale factor granularity involve ROM cost power consumption and the increased sampling rate required to sample more elements during the same pulse length.

From the foregoing description it will be appreciated that the previously stated objects and advantages are achieved by the invention, and that particular advantages include substantial reductions in component density compared to systems using parallel analog beamformers, the combination of phase shifting and amplitude shading, greater dynamic range, spaced advantage of M over prior digital beamformers, and the avoidance of shortcomings attendant geometric quantizations inasmuch as the present system utilizes only linear operations.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. In a sonar system including an array of a number N of transducer elements the outputs of which are adapted to be sequentially scanned at least once during a transmission pulse length $P_L$, a beamformer for combining the scanned outputs of a number M of said elements, said beamformer comprising:

multiplexer means for providing first and second channels of serialized analog signals corresponding to said scanned outputs;

sampling means for taking quadrature X and Y samples of said analog signals in said first and second channels, respectively;

analog to digital means for converting said quadrature X samples to a series of digital X samples in said first channel and a series of digital Y samples in said channel;

storage means for storing M of said digital X samples and for storing M of said digital Y samples;

shading means for applying predetermined shading factors to each of said digital X samples in said storage means and to each of said digital Y samples in said storage means so as to provide M shaded digital X samples and M shaded digital Y samples and for combining thereof to provide alternate outputs of M digital X component values and M digital Y component values;

adder means for preforming predetermined summations of said M digital X component values and of said M digital Y component values to provide a combined digital $X_j$ component value and a combined digital $Y_j$ component value for a resultant beam corresponding to said M elements.

2. A beamformer as defined in claim 1, and wherein: said multiplexer means comprises a first N to 1 multiplexer in said channel and a second N to 1 multiplexer in said second channel.

3. A beamformer as defined in claim 2, and wherein: said sampling means comprises a first sample and hold circuit in said first channel and a second sample and hold circuit in said second channel.

4. A beamformer as defined in claim 3, and wherein: said storage means comprises a first M stage shift register in said first channel and a second M stage shift register in said second channel.

5. A beamformer as defined in claim 4, and wherein said shading means comprises:

M first memory means each addressable alternatively by corresponding ones of said M digital X samples and corresponding ones of said M digital Y samples to provide said shaded digital X and Y samples in accordance with $W_i \cos \theta_i$, where $W_i$ is the amplitude weighting factor and $\theta_i$ is the phase shift factor for the corresponding one of said M transducers;

M second memory means each addressable alternatively by corresponding ones of said M digital Y samples to provide said shaded digital X and Y samples in accordance with $W_i \sin \theta_i$, where $W_i$ is the amplitude weighting factor and $\theta_i$ the phase shift factor for the corresponding one of said M transducers;

control means for alternatively applying said digital X and digital Y samples as addresses to both of the corresponding first and second memory means; and M adder/subtractor means each operative to add the shaded digital X samples of corresponding ones of said M first M second memory means to provide said M digital X component values, and each operative to subtract the shaded digital Y samples of corresponding ones of said M first and M second memory means to provide said M digital Y component values.

6. A beamformer as defined in claim 5, and wherein said adder means comprises:

an adder tree having a plurality of layers of adders, each adder in a first of said layers being operative to sum the outputs of a pair of adjacent ones of said M adder/subtractor means, each adder in a given subsequent layer being operative to sum the outputs of a pair of adjacent adders of the preceding layer, and the ultimate layer comprising a single adder.

7. A beamformer as defined in claim 6, and wherein: said M first and second memory means each comprises a digital read only memory.

8. In a sonar system including an array of a number N of transducer elements for receiving reflections of transmitted pulses of acoustic energy having a predetermined frequency the outputs of which are adapted to be scanned at least once during each transmission pulse length $P_L$, a beamformer for combining outputs of a number M of said elements, said beamformer comprising:

first and second multiplexer means for serializing analog outputs of said scanned array elements to provide first and second multiplexed analog signals;

first sampling means, responsive to said first multiplexed analog signals, for providing analog X samples corresponding to the X components of quadrature pairs of the analog outputs of said scanned elements;

second sampling means, responsive to said second multiplexed analog signals, for providing analog Y samples corresponding to the Y components of quadrature pairs of the analog outputs of said scanned elements, said Y samples being taken at times substantially ¼ period of the transmitted frequency out of phase with the corresponding X samples;

first analog to digital converter means, responsive to said analog X samples, for providing a series of corresponding digital X samples;

second analog to digital converter means, responsive to said analog Y samples, for providing a series of corresponding digital Y samples;

first M stage shift register means, responsive to said series of digital X samples, for storing M of said digital X samples;

second M stage shift register means, responsive to said series of digital Y samples, for storing M of said digital Y samples;

M shading modules, each alternately responsive first to corresponding ones of said stored M digital X samples and then to corresponding ones of said stored digital Y samples for alternately providing M digital X beam component values and M digital Y beam component values corresponding to said M transducers; and an adder tree having a plurality of successive layers of adders, each adder in a first of said layers being operative to sum the outputs of a pair of adjacent ones of said M shading modules, each adder in a given subsequent layer being responsive to the outputs of a pair of adjacent adders of the preceding layer, and the ultimate layer comprising a single adder;

whereby the output of said single adder of said ultimate layer comprises alternate digital $X_j$ component and digital $Y_j$ component values for each beam formed with the outputs of said M transducers, with a new beam being formed following the addition of each new digital X or digital y sample to the first and second shift registers, respectively.

9. A beamformer as defined in claim 8, and wherein said shading modules comprise:

M first memory means each addressable alternatively by corresponding ones of said M digital X samples and corresponding ones of said M digital Y samples to provide said shaded digital X and Y samples in accordance with $W_i \cos \theta_i$, where $W_i$ is the amplitude weighting factor and $\theta_i$ is the phase shift factor for the corresponding one of said M transducers;

M second memory means each addressable alternatively by corresponding ones of said M digital Y samples to provide said shaded digital X and Y samples in accordance with $W_i \sin \theta_i$, where $W_i$ is the amplitude weighting factor and $\theta_i$ the phase shift factor for the corresponding one of said M transducers;

control means for alternately applying said digital X and digital Y samples as addresses to both of the corresponding first and second memory means; and M adder/subtractor means each operative to add the shaded digital X samples of corresponding ones of said M first and M second memory means to provide said M digital X component values, and each operative to subtract the shaded digital Y samples of corresponding ones of said M first and M second memory means to provide said M digital Y component values.

* * * * *